US005202176A

United States Patent [19]

Higuchi et al.

[11] Patent Number: 5,202,176

[45] Date of Patent: Apr. 13, 1993

[54] HEAT TRANSFER RECORDING MATERIALS

[75] Inventors: Youichi Higuchi; Katsuyuki Oshima; Mineo Yamauchi, all of Tokyo, Japan

[73] Assignee: Dai Nippon Insatsu Kabushiki Kaisha, Japan

[21] Appl. No.: 593,009

[22] Filed: Oct. 4, 1990

[30] Foreign Application Priority Data

Oct. 4, 1989 [JP] Japan .................................. 1-257837
Oct. 4, 1989 [JP] Japan .................................. 1-257838
Oct. 4, 1989 [JP] Japan .................................. 1-257839
Oct. 4, 1989 [JP] Japan .................................. 1-257840

[51] Int. Cl.$^5$ .............................................. B32B 9/00

[52] U.S. Cl. .................................... 428/195; 428/340; 428/447; 428/913; 428/914

[58] Field of Search ................. 503/227; 428/195, 480

[56] References Cited

U.S. PATENT DOCUMENTS 4,929,592 5/1990 Kanto et al. ........................ 503/227
5,063,198 11/1991 Imai et al. ........................... 503/227

FOREIGN PATENT DOCUMENTS 0111004 6/1984 European Pat. Off. .

OTHER PUBLICATIONS

Patent Abstracts of Japan, vol. 12, No. 311, Abst. grp. No. M734, Inventor: Matsuda et al., published Aug. 24, 1988.

*Primary Examiner*—Patrick J. Ryan
*Assistant Examiner*—W. Krynski
*Attorney, Agent, or Firm*—Parkhurst, Wendel & Rossi

[57] ABSTRACT

A heat transfer recording material such as a heat transfer image-receiving sheet including a dye-receiving layer formed on the surface of a substrate film or a heat transfer sheet including a dye layer having a dye and a binder and formed on the surface of a substrate film. By containing a specific silane coupling agent in or on the dye-receiving layer or dye layer, this recording material can give a heat-transferred image which has excellent resistance to fingerprints and oils, such as plasticizers, and is of high density and resolution.

5 Claims, 1 Drawing Sheet

HEAT TRANSFER RECORDING MATERIALS

BACKGROUND OF THE INVENTION

The present invention relates to a heat transfer recording material useful for recording images by means of heat transfer techniques using sublimable dyes (thermally migrating dyes) and, more specifically, to a heat transfer recording material capable of forming transferred images excellent in resistance to fingerprints and oils such as plasticizers, and having high density and resolution.

As a replacement to general printing techniques heretofore available, ink jet or heat transfer systems have been developed to give improved monochromatic or full-color images in a simple and fast manner. Of these systems, the most excellent is a so-called sublimation heat transfer system using sublimable dyes, which give full-color images having improved continuous gradation and are comparable to color photographs.

In general, a heat transfer sheet used with the aforesaid sublimation type of heat transfer system includes a substrate film such as a polyester film, which has a sublimable dye-containing dye layer on one side and a heat-resistant layer on the other side to prevent it from sticking to a thermal head.

The dye layer of such a heat transfer sheet is overlaid on an image-receiving sheet having an image-receiving layer formed of a polyester resin, etc., and heat is applied to the back side of the heat transfer sheet through a thermal head in an imagewise manner, so that the dye migrates from the dye layer onto the image-receiving sheet, forming the desired image.

Because the coloring material used is a dye, the aforesaid heat transfer system gives an image excelling in clearness, color reproducibility, etc. and being of a high quality comparable to that of a conventional photographic or printed image. One problem with this system, however, is that when fingers touch the image surface during handling, their lipid (fingerprints) is transferred onto the image, resulting in fading or discoloration of the image Another problem is that when articles containing plasticizers such as plastic erasers or soft films, e.g., transparent files or articles containing other oils touch the image, the image-forming dye migrates onto such articles, so that they are contaminated or the image degrades considerably.

Although such problems may be solved by laminating a transparent film of a material such as polyester on the image, it is so troublesome and costly that it may be used for special purposes alone

SUMMARY OF THE INVENTION

It is therefore an object of this invention to provide a heat transfer recording material capable of forming a transferred image excellent in resistance to fingerprints, oils such as plasticizers, and having high density and resolution.

The aforesaid object is achieved by the following aspects of this invention.

According to the first aspect of this invention, thee is provided a heat transfer image-receiving sheet comprising a substrate film and a dye-receiving layer formed on one side of the substrate film, which is characterized in that said dye-receiving layer contains therein or thereon a non-reactive silane coupling agent.

By incorporation of a specific silane coupling agent in or on the dye-receiving layer, there is provided a heat transfer image-receiving sheet capable of giving an image excellent in resistance to fingerprints, oils, etc. without having any adverse influence upon the dyeability, chromophoric property and other properties of the dye used.

According to the second aspect of this invention, there is provided a heat-transferred image comprising a substrate film, a dye-receiving layer formed on one side of said substrate film and a dye image transferred onto said dye-receiving layer, which is characterized in that said dye-receiving layer contains therein or thereon a non-reactive silane coupling agent.

By incorporation of a specific silane coupling agent in or on the dye-receiving layer, there is provided a heat-transferred image improved in resistance to fingerprints, oils, etc. without having any adverse influence of the dyeability, chromophoric property and other properties of the dye used.

According to the third aspect of this invention, there is provided a process for making a heat-transferred image comprising a substrate film, a dye-receiving layer formed on one side of said substrate film and a dye image transferred onto said dye-receiving layer, which is characterized in that a non-reactive silane coupling agent is incorporated in or on said dye-receiving layer when, before or after forming said image.

By incorporation of a specific silane coupling agent in or on the dye-receiving layer, there is provided a heat-transferred image improved in resistance to fingerprints, oils, etc. without having any adverse influence of the dyeability, chromophoric property and other properties of the dye used.

According to the fourth aspect of this invention, there is provided a heat transfer sheet including a substrate film and a dye layer comprising a dye and a binder, which is characterized in that said dye layer contains therein or thereon a non-reactive silane coupling agent, and is characterized in that said substrate film is provided thereon with a dye layer comprising a dye and a binder and a transfer layer containing a non-reactive silane coupling agent.

A thermally migrating silane coupling agent is incorporated in or on the dye layer or a layer containing the silane coupling agent is provided adjacent to the dye layer to transfer the silane coupling agent simultaneously with, or prior or posterior to, the transfer of the dye, whereby a heat-transferred image excellent in resistance to fingerprints, oils, etc. is provided without having any adverse influence upon the dyeability, chromophoric property and other properties of the dye used.

ILLUSTRATIVE EXPLANATION OF THE INVENTION

Figure 1:
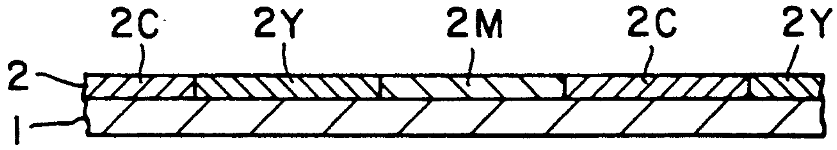
FIGS. 1-4 each are a sectional view of the heat transfer sheet according to this invention.
Figure 2:
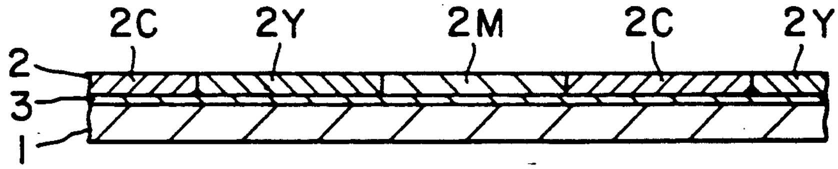

The present invention will now be explained in greater detail with reference to its preferable embodiments.

Image-Receiving Sheet

The heat transfer image-receiving sheet according to this invention comprises a substrate film and a dye-erceiving layer formed on at least one major side of said substrate film.

No limitation is placed on the substrate films used in this invention. For instance, use may be made of various types of papers such as synthetic paper (based on polyolefin, polystyrene, etc.), fine paper, art paper, coated paper, cast coated paper, wall paper, backing paper, synthetic resin or emulsion impregnated paper, synthetic rubber latex impregnated paper, synthetic resin intercalated paper, paper board and cellulose fiber paper; and various kinds of plastic films or sheets based on, e.g., polyolefin, polyvinyl chloride, polyethylene terephthalate, polystyrene, polymethacrylate and polycarbonate. Use may also be made of white, opaque films or foamed sheets obtained from such synthetic resins to which white pigments and fillers are added.

The aforesaid substrate films may be laminated together in any desired combination. Examples of typical laminates are combined cellulose fiber paper/synthetic paper and combined cellulose fiber paper/plastic films or sheets. The substrate film or films may have any desired thickness, for instance, a thickness of generally about 10 to 300 μm.

If the substrate film is poor in its adhesion to the dye-receiving layer to be formed on its major surface, then it is preferable that it be primer- or corona discharge-treated on its surface.

The dye-receiving layer to be provided on the major side of the substrate film is to receive a sublimable dye coming from a heat transfer sheet and maintain the resulting image.

The resins used to form the dye-receiving layer in this invention may include, for instance, polyolefinic resin such as polypropylene; halogenated polymers such as polyvinyl chloride and polyvinylidene chloride; vinyl polymers such as polyvinyl acetate and polyacrylic ester; polyester resins such as polyethylene terephthalate and polybutylene terephthalate; polystyrene resins; polyamide resins; copolymeric resins such as copolymers of olefins such as ethylene and propylene with other vinylic monomers; ionomers; cellulosic resins such as cellulose diacetate; and polycarbonate. Particular preference is given to vinylic and polyester resins.

In order to improve the releasability of the dye-receiving layer at the time of heat transfer, a silicone or fluorine-modified resin may be used in place of, or in combination with, at least a part of the aforesaid resin.

The heat transfer image-receiving sheet of this invention may be obtained in the following manner. With such suitable means as gravure printing, screen printing or reverse roll coating using a gravure, the substrate film is coated on its at least one major side with a solution or dispersion in which such a resin as above mentioned is dissolved or dispersed with the required additives in a suitable organic solvent or water, and drying and heating the substrate film to form a dye-receiving layer.

When forming the above dye-receiving layer, pigments or fillers such as titanium oxide, zinc oxide, kaolin, clay, calcium carbonate and finely divided silica may be added thereto with a view to improving the whiteness of the dye-receiving layer, thereby making further improvements in the definition of the transferred image. In order to make further improvements in the resistance to discoloration and fading of the transferred image, esp. indoors and in a dark place, the dye-receiving layer may also contain UV absorbers and antioxidants.

The thus formed dye-receiving layer may have any desired thickness, but is generally 1 to 50 μm in thickness. Such a dye-receiving layer should preferably be in a continuous film form, but may be formed into a discontinuous film obtained with the use of a resin emulsion or dispersion.

As mentioned above, the present invention is characterized in that when or before or after forming the dye-receiving layer, the specific silane coupling agent is incorporated in or on it.

The silane coupling agents used are of the nonreactive type. In the present disclosure, the term "nonreactive" is understood to mean that the coupling agents are free from highly reactive groups such as amino, hydroxyl, thioalcohol, carboxyl and epoxy groups. Preferable examples are alkylsilanes such as methylmethoxysilane, hexamethyldisilazane and γ-chloropropyl trimethoxy silane; and silane compounds having a polymerizable double bond such as vinyltrichlorosilane, vinyltris(β-methoxyethoxy)silane, vinyltrimethoxysilane, vinyltriethoxysilane and γ-methacryloxypropyl trimethoxy silane, all heretofore used as non-reactive silane coupling agents. It is understood, however, that other non-reactive silane coupling agents may also be used.

By contrast, silane coupling agents containing active hydrogen, e.g., those containing a basic or acidic group such as an amino, phenolic hydroxyl, thioalcohol or carboxyl group are unpreferred, because image forming dyes are so affected by the acid and base that the resulting images often discolor. Silane coupling agents containing a highly reactive group such as an epoxy group are again unpreferred, because they are so likely to react with the substituted amino, hydroxyl or other group of dyes that the dyes discolor or fade away.

Suitable for this invention are thus silane coupling agents containing groups unlikely to pose the aforesaid problems, for instance, alkyl, vinyl and (meth)acryloxy groups. With silane coupling agents having a polymerizable double bond in particular, it is possible to obtain a much more improved effect on preserving images by polymerization and crosslinking through such a double bond.

Incorporation of the silane coupling agent in or on the dye-receiving layer is achieved by:

(1) coating the silane coupling agent on the surface of the substrate film before forming the dye-receiving layer, (2) incorporating the silane coupling agent in or on the dye-receiving layer simultaneously with its formation by adding it to a coating solution for forming the dye-receiving layer, and (3) applying the silane coupling agent on the surface of the previously formed dye-receiving layer by suitable means such as coating, spraying, impregnation or transfer. It is noted that this invention is not limited to the aforesaid three methods.

Preferably, the silane coupling agent should be used in an amount of 0.1 to 120 parts by weight per 100 parts by weight of the dye-receiving layer forming resin. In too small an amount, on the one hand, any satisfactory resistance to fingerprints, oils, etc. cannot be obtained. In too large an amount, on the other hand, the sensitivity, strength, dye receptivity and other factors of the dye-receiving layer drop, resulting in unusual heat transfer.

By appropriate selection of substrates films, the image-receiving sheets of this invention may find use in various fields including heat transfer-recordable heat transfer sheets or cards and sheets for forming transmission-type manuscripts.

In the case of the image-receiving sheet of this invention, a cushioning layer may be additionally interposed between the substrate film and the dye-receiving layer, thereby making it possible to reduce noise at the time of printing and transfer and record on the dye-receiving layer an image corresponding to imagewise information with good reproducibility.

The cushioning layer may be formed of a suitable material such as polyurethane resin, acrylic resin, polyethylenical resin, butadiene rubber and epoxy resin, and may preferably have a thickness of about 2 to 20 μm.

The substrate film may also be provided on its back side with a slip layer, which may be formed of a suitable material such as (meth)acrylate resin such as methyl (meth)acrylate and vinylic copolymers such as vinyl chloride/vinyl acetate copolymers.

Moreover, the image-receiving sheet of this invention may be provided with a detection mark, which serves very well, for instance, for the alignment of a heat transfer sheet with the image-receiving sheet. By way of example, a detection mark capable of being sensed by a phototube detector may be provided on the back side or elsewhere on the substrate sheet by printing or other means.

The heat transfer sheet used for heat transfer to be carried out with the heat transfer image-receiving sheet of this invention includes paper or a polyester film on which a dye layer containing a sublimable dye is provided. For this invention, conventional, known heat transfer sheets may all be used as such.

As heat energy applying means at the time of heat transfer, conventional applicator means hitherto known in the art may all be used. For instance, the desired object is successfully achievable by the application of a heat energy of about 5 to 100 mJ/mm$^2$ for a controlled recording time with such recording hardware as a thermal printer (e.g., Video Printer VY-100 made by Hitachi Co., Ltd., Japan).

According to this invention as described above, there is provided a heat transfer image-receiving sheet wherein the dye-receiving layer contains a specific silane coupling agent therein or thereon to give an image excellent in resistance to fingerprints, oils, etc. without having any adverse influence on its dye receptivity, the chromophoric property of the dye used, etc.

Heat-Transferred Image

An image heat-transferred according to this invention comprises a substrate film, a dye-receiving layer formed on one surface of said substrate film and a dye image heat-transferred onto said dye-receiving layer and is characterized in that said dye-receiving layer contains a non-reactive silane coupling agent therein or thereon. No limitation is placed on the substrate films used in this invention. For instance, use may be made of various types of papers such as synthetic paper (based on polyolefin, polystyrene, etc.), fine paper, art paper, coated paper, cast coated paper, wall paper, backing paper, synthetic resin or emulsion impregnated paper, synthetic rubber latex impregnated paper, synthetic resin intercalated paper, paper board and cellulose fiber paper; and various kinds of plastic films or sheets based on, e.g., polyolefin, polyvinyl chloride, polyethylene terephthalate, polystyrene, polymethacrylate and polycarbonate. Use may also be made of white, opaque films or foamed sheets obtained from such synthetic resins to which white pigments and fillers are added.

The aforesaid substrate films may be laminated together in any desired combination. Examples of typical laminates are combined cellulose fiber paper/synthetic paper and combined cellulose fiber paper/plastic films or sheets. The substrate film or films may have any desired thickness, for instance, a thickness of generally about 10 to 300 μm.

If the substrate film is poor in its adhesion to the dye-receiving layer to be formed on its major surface, then it is preferred that it be primer- or corona discharge-treated on the surface.

The dye-receiving layer to be provided on the major side of the substrate film is to receive a sublimable dye coming from a heat transfer sheet and maintain the resulting image.

The resins used to form the dye-receiving layer in this invention may include, for instance, polyolefinic resin such as polypropylene; halogenated polymers such as polyvinyl chloride and polyvinylidene chloride; vinyl polymers such as polyvinyl acetate and polyacrylic ester; polyester resins such as polyethylene terephthalate and polybutylene terephthalate; polystyrene resins; polyamide resins; copolymeric resins such as copolymers of olefins such as ethylene and propylene with other vinylic monomers; ionomers; cellulosic resins such as cellulose diacetate; and polycarbonate. Particular preference is given to vinylic and polyester resins.

In order to improve the releasability of the dye-receiving layer at the time of heat transfer, a silicone or fluorine-modified resin may be used in place of, or in combination with, at least a part of the aforesaid resin.

The heat transfer image-receiving sheet of this invention may be obtained in the following manner. With such suitable means as gravure printing, screen printing or reverse roll coating using a gravure, the substrate film is coated on its at least one major side with a solution or dispersion in which such a resin as above mentioned is dissolved or dispersed with the required additives in a suitable organic solvent or water, and drying and heating the substrate film to form a dye-receiving layer.

When forming the above dye-receiving layer, pigments or fillers such as titanium oxide, zinc oxide, kaolin, clay, calcium carbonate and finely divided silica may be added thereto with a view to improving the whiteness of the dye-receiving layer, thereby making further improvements in the resistance to discoloration and fading of the transferred image, esp. indoors and in a dark place, the dye-receiving layer may also contain UV absorbers and antioxidants.

The thus formed dye-receiving layer may have any desired thickness, but is generally 1 to 50 μm in thickness. Such a dye-receiving layer should preferably be in a continuous film form, but may be formed into a discontinuous film obtained with the use of a resin emulsion or dispersion.

The heat transfer sheet used for forming an image by heat transfer includes paper or a polyester film on which a dye layer containing a sublimable dye is provided. For this invention, conventional, known heat transfer sheets may all be used as such. Preferable examples of the dyes used are red dyes such as MS Red G, Macrolex Red Violet R, Ceres Red 7B, Samaron Red HBSL and SK Rubin SEGL; yellow dyes such as Phorone Brilliant Yellow, S-6GL, PTY52, Macrolex Yellow S-6G and Kayaset Yellow DI-055; and blue dyes such as Kayaset Blue 714, Vacsolin Blue AP-FW, Phorone Brilliant S-R, MS Blue 100 and Dito Blue No. 1.

As heat energy applying means at the time of heat transfer, conventional applicator means hitherto known in the art may all be used. For instance, the desired object is successfully achievable by the application of a heat energy of about 5 to 100 $mJ/mm^2$ for a controlled recording time with such recording hardware as a thermal printer (e.g., Video Printer VY-100 made by Hitachi Co., Ltd.).

The image heat-transferred according to this invention may be obtained by incorporating a specific silane coupling agent in or on the dye-receiving layer when or before or after forming an image by heat transfer processes heretofore known in the art.

The silane coupling agents used in this invention are of the non-reactive type. In the present disclosure, the term "non-reactive" is understood to mean that the coupling agents are free from highly reactive groups such as amino, hydroxyl, thioalcohol, carboxyl and epoxy groups. Preferable examples are alkylsilanes such as methylmethoxysilane, hexamethyldisilazane and γ-chloropropyl trimethoxy silane; and silane compounds having a polymerizable double bond such as vinyltrichlorosilane, vinyl-tris(β-methoxyethoxy)silane, vinyltrimethoxysilane, vinyltriethoxysilane and γ-methacryloxypropyl trimethoxy silane, all heretofore used as non-reactive silane coupling agents. It is understood, however, that other non-reactive silane coupling agents may also be used.

By contrast, silane coupling agents containing active hydrogen, e.g., those containing a basic or acidic group such as an amino, phenolic hydroxyl, thioalcohol or carboxyl group are unpreferred, because image forming dyes are so affected by the acid or base that the resulting images often discolor. Silane coupling agents containing a highly reactive group such as an epoxy group are again unpreferred, because they are so likely to react with the substituted amino, hydroxyl or other group of dyes that the dyes discolor or fade away.

Suitable for this invention are thus silane coupling agents containing groups unlikely to pose the aforesaid problems, for instance, alkyl, vinyl and (meth)acryloxy groups. With silane coupling agents having a polymerizable double bond in particular, it is possible to obtain a much more improved effect on preserving images by polymerization and crosslinking through such a double bond.

Incorporation of the silane coupling agent in or on the dye-receiving layer is achieved by:

(1) coating the silane coupling agent on the surface of there is provided a heat transfer image-receiving sheet wherein the dye-receiving layer contains a specific silane coupling agent therein or thereon to give an image excellent in resistance to fingerprints, oils, etc. without having any adverse influence on its dye receptivity, the chromophoric property of the dye used, etc. the substrate film before forming the dye-receiving layer, (2) incorporating the silane coupling agent in or on the dye-receiving layer simultaneously with its formation by adding it to a coating solution for forming the dye-receiving layer, (3) applying the silane coupling agent on the surface of the previously formed dye-receiving layer with suitable means such as coating, spraying, impregnation or transfer, (4) previously incorporating the silane coupling agent in the dye layer of the heat transfer sheet to effect the heat transfer of the dye simultaneously with incorporating the silane coupling agent in the dye-receiving layer, and (5) applying the silane coupling agent on the surface of the previously formed image with suitable means such as coating, spraying, impregnation or transfer. However, it is understood that this invention is not limited to these five such methods.

Preferably, the silane coupling agent should be used in an amount of 0.1 to 120 parts by weight per 100 parts by weight of the dye-receiving layer forming resin. In too small an amount, on the one hand, any satisfactory resistance to fingerprints, oils, etc. cannot be obtained. In too large an amount, on the other hand, the sensitivity, strength, dye receptivity and other factors of the dye-receiving layer drop.

By appropriate selection of the substrate film of the image-receiving sheet, the image heat-transferred according to this invention may be used in various forms such as sheets, cards or a transmission type of manuscripts, all equivalent to photographs or prints.

According to this invention as described above, there is provided a heat-transferred image excellent in resistance to fingerprints, oils, etc. without having any adverse influence on dye receptivity, the chromophoric property of the dye used, etc. by incorporation of a specific silane coupling agent in or on the dye-receiving layer.

Heat-Transfer Sheet

As illustrated in FIG. 1, one embodiment of the heat transfer sheet according to this invention basically comprises a substrate film 1 and a dye layer 2 formed thereon, as is the case with conventional techniques, and is characterized in that said dye layer contains a thermally migrating silane coupling agent.

For the substrate film of the aforesaid heat transfer sheet, use may be made of any material having some heat resistance and strength and heretofore known in the art. For instance, use may be made of papers, various processed papers or films of polyester, polystyrene, polypropylene, polysulfone, alamide, polycarbonate, polyvinyl alcohol and cellophane, all having a thickness of 0.5 to 50 μm, preferably 3 to 10 μm. Particular preference is given to polyester films. Although not critical, such substrate films may take a discontinuous or continuous form.

The dye layer formed on the surface of the substrate film is a layer comprising at least a dye and a thermally migrating silane coupling agent which are carried by any desired binder resin.

In this invention, dyes used for conventional known heat transfer sheets are all effectively usable for this purpose. For instance, some preferred dyes include red dyes such as MS Red G, Macrolex Red Violet R, Ceres Red 7B, Samaron Red HBSL and Resolin Red F3BS; yellow dyes such as Phorone Brilliant Yellow 6GL, PTY-52, Macrolex Yellow 6G and Kayaset Yellow DI-055; and blue dyes such as Kayaset Blue 714, Vacsolin Blue AP-FW, Phorone Brilliant Blue S-R and MS Blue 100.

As the binder resins for carrying such dyes as described above, resins heretofore known in the art may all be used, as preferably exemplified by cellulosic resins such as ethyl cellulose, hydroxyethyl cellulose, ethylhydroxy cellulose, hydroxypropyl cellulose, methyl cellulose, cellulose acetate and cellulose acetate butyrate; vinylic resins such as polyvinyl alcohol, polyvinyl acetate, polyvinyl butyral, polyvinyl acetal, polyvinyl pyrrolidone and polyacrylamide; and polyesters. Of these resins, preference is given to cellulose, acetal, butyral and polyester types of resins in view of heat resistance, dye migration and other factors.

The silane coupling agents used in this invention are of the thermally migrating type. Preferable examples to this end are alkylsilanes such as methylmethoxysilane, hexamethyldisilazane and γ-chloropropyl trimethoxy silane; and silane compounds having a polymerizable double bond such as vinyltrichlorosilane, vinyl-tris(β-methoxyethoxy)silane, vinyltrimethoxysilane, vinyltriethoxysilane and γ-methacryloxypropyl trimethoxy silane, all heretofore used as thermally migrating silane coupling agents. It is understood, however, that other thermally migrating silane coupling agents may also be used.

By contrast, silane coupling agents containing a basic or acidic group such as an amino, phenolic hydroxyl, thioalcohol or carboxyl group are unpreferred, because of their insufficient thermal migration and because image forming dyes are so affected by the acid or base that the resulting images often change in quality and discolor. Silane coupling agents containing a highly reactive group such as an epoxy group are again unpreferred, because they react with the binder of the dye layer and because, as is the case with the foregoing, they are so likely to react with the substituted amino, hydroxyl or other group of dyes that the dyes change in quality or they are prone to lose their thermal migration.

Suitable for this invention are thus silane coupling agents containing groups unlikely to pose the aforesaid problems, for instance, alkyl, vinyl and (meth)acryloxy groups. With silane coupling agents having a polymerizable double bond in particular, it is possible to obtain a much more improved effect on preserving images by polymerization and crosslinking through such a double bond.

Incorporation of the silane coupling agent in or on the dye layer is achieved by:

(1) coating the silane coupling agent on the surface of the substrate film prior to forming the dye layer, (2) adding the silane coupling agent to a coating solution for forming the dye layer to form the dye layer simultaneously with incorporating the silane coupling agent in the dye-receiving layer, and (3) using a dye previously treated with the silane coupling agent as a dye to be added to a coating solution for forming the dye layer. In this method, the aforesaid dyes and silane coupling agents may all be used. The dyes may be treated with a solventless, organic solvent or aqueous system. For instance, stirring may be carried out at about 70° C. for 30 minutes to one hour. The organic solvent or aqueous system may or may not be homogenized. For instance, the treatment may be followed by drying-up. The amount of the silane coupling agent used may be several % of, or equal to, the weight of the dye used.

For the same purpose, (4) the silane coupling agent may be applied to the surface of the previously formed dye-receiving layer with suitable means such as coating, spraying, impregnation or transferring. It is to be understood that this invention is not limited to four such methods.

Preferably, the silane coupling agent should be used in an amount of 0.1 to 120 parts by weight per 100 parts by weight of the dye layer forming resin. In too small an amount, on the one hand, any satisfactory resistance to fingerprints, oils, etc. cannot be obtained. In too large an amount, on the other hand, the strength of the dye layer, the stability of dispersion of the dye, etc. drop.

Additionally, the dye layer may contain various conventional additives heretofore known in the art, if required.

Preferably, such a dye layer may be formed by dissolving or dispersing the aforesaid sublimable dye, binder resin and silane coupling agent. with any desired components in a suitable solvent to prepare a coating material or ink for forming the dye layer, and coating that material or ink on the aforesaid substrate film, followed by drying.

The thus formed dye layer may have a thickness of 0.2 to 5.0 μm, preferably 0.4 to 2.0 μm, and it is preferred that the sublimable dye account for 5 to 90% by weight, preferably 10 to 70% by weight of the dye layer.

When the desired image is monochromatic, the dye layer formed may contain a monochromatic dye selected from the aforesaid dyes, and when the desired image is a full-color image, the dye layer may contain suitable cyan, magenta and yellow (if required, black) dyes, e.g., Yellow 2Y, Magenta 2M and Cyan 2C (if required, a black dye), as schematically illustrated in the sectional view of FIG. 1.

Figure 3:
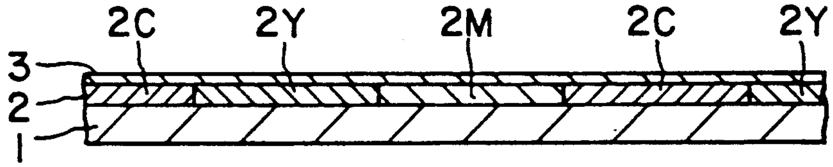
Figure 4:
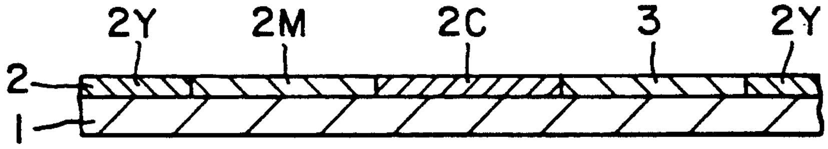

In an alternative embodiment shown in FIG. 1, a dye layer 2 may be formed is on the surface of a substrate film 1 through a layer 3 containing the thermally migrating silane coupling agent but containing no dye. In this case, the silane coupling agent migrates into the dye layer with time and is transferred onto the image-receiving sheet along with the dye at the time of heat transfer. In a further embodiment shown in FIG. 3, a silane coupling agent-containing layer may be formed on the surface of the dye layer 2. In a still further embodiment shown in FIG. 4, a heat transfer layer 3 containing the thermally migrating silane coupling agent may be formed adjacent to a dye layer 2.

The silane coupling agent-containing layer 3 illustrated may be formed by adding the thermally migrating silane coupling agent to the binder resin in the same manner as described in connection with the dye layer. In this case, it is most unlikely that the thermally migrating silane coupling agent may present such dye problems as described above. Consequently, the thermally migrating silane coupling agent can be used in a wide quantitative range of, say, 1 to 200 parts by weight per 100 parts by weight of the binder, thus leading to an advantage that a relatively large amount of the thermally migrating silane coupling agent can be imparted to the surface of the imaged formed.

The sheet to be heat-transferred (the image-receiving sheet) used to form an image with such a heat transfer sheet as mentioned above may be such that its recording surface can receive the aforesaid dye. Alternatively, the image-receiving sheet may be formed by providing a dye-receiving layer on at least one side of a substrate incapable of receiving a dye such as paper, a metal, glass or resin.

Image-receiving materials which may not be provided with a dye receiving layer, for instance, include fibers, woven fabrics, films, sheets and formings of polyolefinic resins such as polypropylene; halogenated polymers such as polyvinyl chloride and polyvinylidene chloride; vinylic polymers such as polyvinyl acetate and polyacryl ester; polyester type resins such as polyethylene terephthalate and polybutylene terephthalate; polystyrene type resins; polyamide resins; copolymeric resins such as copolymers of an olefin, e.g., ethylene or propylene with other vinyl monomers; ionomers; cellulosic resins such as cellulose diacetate; and polycarbonates. The most preference is given to polyester in sheet or film form or processed paper having a polyester layer.

For this invention, other image-receiving materials incapable of receiving dyes such as paper, metal and glass materials may also be used, if a solution or dispersion of such a dye-receptive resin as mentioned above is coated and dried on their recording surfaces or, alternatively, a film such as a resin is laminated on their recording surfaces. Even dye-receptive image-receiving materials such as the aforesaid ones may be provided on their surfaces with a dye-receiving layer formed of a resin more improved in dye-receptivity, as is the case with the aforesaid paper image-receiving materials.

The thus formed dye receiving layer may be formed of a material or materials, and may further contain various additives within such an extent that the desired object of this invention is successfully achievable, as will be understood by those skilled in the art.

Such a dye-receiving layer may have any desired thickness, but may generally be in the range of 3 to 50 μm. Although such a dye-receiving layer is preferably in a continuous film form, it may be in a discontinuous film form obtained with a resin emulsion or dispersion.

In order to apply heat energy to carry out heat transfer with the aforesaid heat transfer sheet and image-receiving material, conventional energy applying means heretofore known in the art may all be used. For instance, the desired image may be formed by applying a heat energy of about 5 to 100 $mJ/mm^2$ for a controlled recording time with recording hardware such as a thermal printer (e.g., Video Printer VY-100 made by Hitachi, Ltd.).

According to this invention as described above, there is provided a heat-transferred image excellent in resistance to fingerprints, oils, etc. without having any adverse influence on the dyeability, chromophoric property and other properties of the dye used by incorporating the thermally migrating silane coupling agent in or on the dye layer or providing a layer containing the silane coupling agent adjacent to the dye layer, thereby transferring the silane coupling agent onto the image-receiving layer simultaneously with, or prior or posterior to, the transfer of the dye.

The present invention will now be explained more illustratively with reference to the examples and comparative examples, in which the "part" or "%" is given by weight, unless otherwise stated.

EXAMPLE A1

A synthetic paper (Yupo FRG-150 of 150 μm in thickness, made by Oji Yuka Co., Ltd., Japan) was used as a substrate film. With a bar coater, a coating solution having the following composition was coated on one surface of the synthetic paper to a dry coverage of 5.0 $g/m^2$. Subsequent drying gave a heat transfer image-receiving sheet according to this invention.

| | |
|---|---|
| Polyester resin (Vylon 600 made by Toyobo Co., Ltd., Japan) | 20 parts |
| Vinyltriethoxysilane | 3 parts |
| Amin-modified silicone (X-22-3050C made by The Shin-Etsu Chemical Co., Ltd., Japan) | 2 parts |

-continued

| | |
|---|---|
| Epoxy-modified silicone (X-22-3000E made by The Shin-Etsu Chemical Co., Ltd., Japan) | 2 parts |
| Methyl ethyl ketone/toluene (1:) | 73 parts |

EXAMPLE A2

Example A1 was repeated, provided that a coating solution having the following composition was used in place of that of Example A1, thereby obtaining a heat transfer image-receiving sheet according to this invention.

| | |
|---|---|
| Polyester resin (Vylon 600 made by Toyobo Co., Ltd., Japan) | 25 parts |
| Vinyltrimethoxysilane | 5 parts |
| Amino-modified silicone (X-22-3050C made by The Shin-Etsu Chemical Co., Ltd., Japan) | 1 part |
| Epoxy-modofied silicone (X-22-3000E made by The Shin-Etsu Chemical Co., Ltd., Japan) | 1 part |
| Methyl ethyl ketone/toluene (1:1) | 68 parts |

EXAMPLE A3

Example A1 was repeated, provided that a coating solution having the following composition was used in place of that of Example A1, thereby obtaining a heat transfer image-receiving sheet according to this invention.

| | |
|---|---|
| Vinyl chloride/vinyl acetate copolymer (#1000A made by Denki Kagaku Kogyo K.K., Japan) | 23 parts |
| Vinyl-tris(β-methoxyethoxy)silane | 5 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 68 parts |

EXAMPLE A4

Example A1 was repeated, provided that a coating solution having the following composition was used in place of that of Example A1, thereby obtaining a heat transfer image-receiving sheet according to this invention.

| | |
|---|---|
| Polyester resin (Vylon 600 made by Toyobo Co., Ltd., Japan) | 27 parts |
| Vinyltrichlorosilane | 4 parts |
| Amino-modified silicone (X-22-3050C made by The Shin-Etsu Chemical Co., Ltd., Japan) | 1 part |
| Epoxy-modified silicone (X-22-3000E made by The Shin-Etsu Chemical Co., Ltd., Japan) | 1 part |
| Methyl ethyl ketone/toluene (1:1) | 67 parts |

EXAMPLE A5

Example A1 was repeated, provided that the following coating solution was used in place of that of Example A1, thereby obtaining a heat transfer image-receiving sheet according to this invention.

| | |
|---|---|
| Vinyl chloride/vinyl acetate copolymer (#1000A made by Denki Kagaku Kogyo K.K., Japan) | 25 parts |
| γ-methacryloxypropyl trimethoxy silane | 4 parts |
| Amino-modified silicone (X-22-3050C made by The Shin-Etsu Chemical Co., Ltd., Japan) | 1 part |

-continued

| | |
|---|---|
| Epoxy-modified silicone (X-22-3000E made by The Shin-Etsu Chemical Co., Ltd., Japan) | 1 part |
| Methyl ethyl ketone/toluene (1:1) | 67 parts |

EXAMPLE A6

A coating solution having the following composition was used in place of that of Ex. A1 under otherwise similar conditions as applied in Ex. A1, thereby obtaining a heat transfer image-receiving sheet according to this invention.

| | |
|---|---|
| Polyester resin (Vylon 600 made by Toyobo Co., Ltd., Japan) | 20 parts |
| Vinyltrimethoxysilane | 2 parts |
| γ-methacryloxypropyl trimethoxy silane | 2 parts |
| Amino-modified silicone (X-22-3050C made by The Shin-Etsu Chemical Co., Ltd., Japan) | 1 part |
| Epoxy-modified silicone (X-22-3000E made by The Shin-Etsu Chemical Co., Ltd., Japan) | 1 part |
| Methyl ethyl ketone/toluene (1:1) | 67 parts |

COMPARATIVE EXAMPLE A1

A coating solution having the following composition was used in place of that of Ex. A1 under otherwise similar conditions as applied in Ex. B1, thereby obtaining a comparative heat transfer image-receiving sheet.

| | |
|---|---|
| Polyester resin (Vylon 600 made by Toyobo Co., Ltd., Japan) | 25 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 71 parts |

COMPARATIVE EXAMPLE A2

A coating solution having the following composition was used in place of that of Ex. A1 under otherwise similar conditions as applied in Ex. A1, thereby obtaining a comparative heat transfer image-receiving sheet.

| | |
|---|---|
| Polyester resin (Vylon 600 made by Toyobo Co., Ltd., Japan) | 20 parts |
| γ-aminopropyl triethoxy silane | 3 parts |
| Amino-modified silicone (X-22-3050C made by The Shin-Etsu Chemical Co., Ltd., Japan) | 1 part |
| Epoxy-modified silicone (X-22-3000E made by The Shin-Etsu Chemical Co., Ltd., Japan) | 1 part |
| Methyl ethyl ketone/toluene (1:1) | 64 parts |

COMPARATIVE EXAMPLE A3

A coating solution having the following composition was used in place of that of Ex. A1 under otherwise similar conditions as applied in Ex. A1, thereby obtaining a comparative heat transfer image-receiving sheet.

| | |
|---|---|
| Polyester resin (Vylon 600 made by Toyobo Co., Ltd., Japan) | 20 parts |
| γ-glycidoxypropyl triethoxy silane | 3 parts |
| Amino-modified silicone (X-22-3050C made by The Shin-Etsu Chemical Co., Ltd., Japan) | 1 part |
| Epoxy-modified silicone (X-22-3000E made by The Shin-Etsu Chemical Co., Ltd., Japan) | 1 part |

-continued

| | |
|---|---|
| Methyl ethyl ketone/toluene (1:1) | 64 parts |

COMPARATIVE EXAMPLE A4

A coating solution having the following composition was used in place of that of Ex. A1 under otherwise similar conditions as applied in Ex. A1, thereby obtaining a comparative heat transfer image-receiving sheet.

| | |
|---|---|
| Polyester resin (Vylon 600 made by Toyobo Co., Ltd., Japan) | 20 parts |
| Vinyltriethoxysilane | 0.02 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 76 parts |

COMPARATIVE EXAMPLE A5

A coating solution having the following composition was used in place of that of Ex. A1 under otherwise similar conditions as applied in Ex. A1, thereby obtaining a comparative heat transfer image-receiving sheet.

| | |
|---|---|
| Polyester resin (Vylon 600 made by Toyobo Co., Ltd., Japan) | 20 parts |
| Vinyltriethoxysilane | 25 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 51 parts |

A dye layer forming ink composition consisting of the following components was prepared and, then, coated with a wire bar on a 6 μm-thick polyethylene terephthalate film subjected to a heat-resistant treatment on its back side to a dry coverage of 1.0 $g/m^2$. Subsequent drying gave a heat transfer sheet.

| | |
|---|---|
| Disperse dye (Kayaset Blue 714-C.I. Solvent Blue 63 made by Nippon Kayaku K.K., Japan) | 4.0 parts |
| Polyvinyl butyral resin (Eslec BX-1 made by Sekisui Chemical Co., Ltd., Japan) | 4.3 parts |
| Fluorine fatty acid-modified silicone wax (X-24-3525 made by the Shin-Etsu Chemical Co., Ltd., Japan) | 0.4 parts |
| Methyl ethyl ketone/toluene (at a weight ratio of 1:1) | 80.0 parts |
| Isobutanol | 10.0 parts |

Each of the aforesaid heat transfer image-receiving sheets was overlaid on the heat transfer sheet, while the dye layer was in opposition to the surface of the dye-receiving layer. With a thermal sublimation type of transfer printer (VY-50 made by Hitachi Ltd.), a printing energy of 40 mJ $mm^2$ was applied to the assembly from the back side of the heat transfer sheet through the thermal head for solid printing at a medium density. The quality and resistance to fingerprints and plasticizers of each of the obtained images were estimated. The results are reported in Table 1.

TABLE 1

| | WHAT WAS ESTIMATED | | |
|---|---|---|---|
| | QUALITY | RESISTANCE TO FINGER PRINTS | RESISTANCE TO PLASTICIZERS |
| Ex. A1 | ○ | ○ | ○ |
| Ex. A2 | ○ | ○ | ○ |
| Ex. A3 | ○ | ○ | ○ |
| Ex. A4 | ○ | ○ | ○ |
| Ex. A5 | ○ | ○ | ○ |
| Ex. A6 | ○ | ○ | ○ |
| Comp. Ex. A1 | ○ | × | × |
| Comp. Ex. A2 | × | Δ | Δ |
| Comp. Ex. A3 | ○ | × | × |
| Comp. Ex. A4 | × | Δ | Δ |
| Comp. Ex. A5 | ×(the sensitivity dropped with the occurrence of unusual transfer) | | |

CRITERIA FOR ESTIMATION

Image Quality

After each image had been subjected to accelerated testing at 60° C. for 3 days, its clearness, color reproducibility and resolution were visually observed.

○: No change occurred.
Δ: Slight fading or discoloration was found.
×: Remarkable fading or discoloration was found.

Resistance to Fingerprints

A fingerprint was printed under pressure on each image surface, which was in turn allowed to stand at 60° C. for 3 days to observe changes in the image.

○: No change occurred.
Δ: Slight fading or discoloration was found.
×: Remarkable fading or discoloration was found.

Resistance to Plasticizers

A plastic eraser was placed on each image surface, to which a load of 250 g $cm^2$ was applied at 30° C. over 40 minutes. Thereafter, changes in the image were visually observed.

○: No change occurred.
Δ: Slight fading or discoloration was found.
×: Remarkable fading or discoloration was found.

EXAMPLE B1

A synthetic paper (Yupo FRG-150 of 150 μm in thickness, made by Oji Yuka Co., Ltd.) was used as a substrate film. With a bar coater, a coating solution having the following composition was coated on one surface of the substrate film to a dry coverage of 5.0 $g/m^2$. Subsequent drying gave a heat transfer image-receiving sheet according to this invention.

| | |
|---|---|
| Polyester resin (Vylon 600 made by Toyobo Co., Ltd., Japan) | 20 parts |
| Vinyltriethoxysilane | 3 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 73 parts |

EXAMPLE B2

Example B1 was repeated, provided that a coating solution of Example B1, thereby obtaining a heat transfer image-receiving sheet according to this invention.

| | |
|---|---|
| Polyester resin (Vylon 600 made by Toyobo Co., Ltd., Japan) | 25 parts |
| Vinyltrimethoxysilane | 5 parts |
| Amino-modified silicone (X-22-3050C made by The Shin-Etsu Chemical Co., Ltd., Japan) | 1 part |
| Epoxy-modified silicone (X-22-3000E made by The Shin-Etsu Chemical Co., Ltd., Japan) | 1 part |
| Methyl ethyl ketone/toluene (1:1) | 68 parts |

EXAMPLE B3

Example B1 was repeated, provided that the following coating solution was used in place of that of Example B1, thereby obtaining a heat transfer image-receiving sheet according to this invention.

| | |
|---|---|
| Vinyl chloride/vinyl acetate copolymer (#1000A) made by Denki Kagaku Kogyo K.K., Japan) | 23 parts |
| Vinyl-tris(β-methoxyethoxy)silane | 5 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 68 parts |

EXAMPLE B4

Example B1 was repeated, provided that the following coating solution was used in place of that of Example B1, thereby obtaining a heat transfer image-receiving sheet according to this invention.

| | |
|---|---|
| Polyester resin (Vylon 600 made by Toyobo Co., Ltd., Japan) | 27 parts |
| Vinyltrichlorosilane | 4 parts |
| Amino-modified silicone (X-22-3050C made by The Shin-Etsu Chemical Co., Ltd., Japan) | 1 parts |
| Epoxy-modified silicone (X-22-3000E made by The Shin-Etsu Chemical Co., Ltd., Japan) | 1 parts |
| Methyl ethyl ketone/toluene (1:1) | 67 parts |

COMPARATIVE EXAMPLE B1

A coating solution having the following composition was used in place of that of Ex. B1 under otherwise similar conditions as applied in Ex. B1, thereby obtaining a comparative heat transfer image-receiving sheet.

| | |
|---|---|
| Polyester resin (Vylon 600 made by Toyobo Co., Ltd., Japan) | 25 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 71 parts |

COMPARATIVE EXAMPLE B2

A coating solution having the following composition was used in place of that of Ex. B1 under otherwise similar conditions as applied in Ex. B1, thereby obtaining a comparative heat transfer image-receiving sheet.

| | |
|---|---|
| Polyester resin (Vylon 600 made by Toyobo Co., Ltd., Japan) | 20 parts |
| γ-aminopropyl triethoxy silane | 3 parts |
| Amino-modified silicone (X-22-3050C made by The Shin-Etsu Chemical Co., Ltd., Japan) | 1 part |

-continued

| | |
|---|---|
| Epoxy-modified silicone (X-22-3000E made by The Shin-Etsu Chemical Co., Ltd., Japan) | 1 part |
| Methyl ethyl ketone/toluene (1:1) | 64 parts |

COMPARATIVE EXAMPLE B3

A coating solution having the following composition was used in place of that of Ex. B1 under otherwise similar conditions as applied in Ex. B1, thereby obtaining a comparative heat transfer image-receiving sheet.

| | |
|---|---|
| Polyester resin (Vylon 600 made by Toyobo Co., Ltd., Japan) | 20 parts |
| γ-glycidoxypropyl triethoxy silane | 3 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 73 parts |

COMPARATIVE EXAMPLE B4

A coating solution having the following composition was used in place of that of Ex. B1 under otherwise similar conditions as applied in Ex. B1, thereby obtaining a comparative heat transfer image-receiving sheet.

| | |
|---|---|
| Polyester resin (Vylon 600 made by Toyobo Co., Ltd., Japan) | 20 parts |
| Vinyltriethoxysilane | 0.02 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 76 parts |

COMPARATIVE EXAMPLE B5

A coating solution having the following composition was used in place of that of Ex. B1 under otherwise similar conditions as applied in Ex. B1, thereby obtaining a comparative heat transfer image-receiving sheet.

| | |
|---|---|
| Polyester resin (Vylon 600 made by Toyobo Co., Ltd., Japan) | 20 parts |
| Vinyltriethoxysilane | 25 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 51 parts |

A dye layer forming ink composition composed of the following components was prepared and, then, coated on a 6 μm-thick polyethylene terephthalate film subjected to a heat-resistant treatment on its back side to a dry coverage of 1.0 g/m$^2$. Subsequent drying gave a heat transfer sheet.

| | |
|---|---|
| Disperse dye (Kayaset Blue 714-C.I. Solvent Blue 63 made by Nippon Kayaku K.K., Japan) | 4.0 parts |
| Polyvinyl butyral resin (Eslec BX-1 made by Sekisui Chemical Co., Ltd., Japan) | 4.3 parts |
| Fluorine fatty acid-modified silicone wax (X-24-3525 made by the Shin-Etsu Chemical Co., Ltd., Japan) | 0.4 parts |
| Methyl ethyl ketone/toluene (at a weight ratio of 1:1) | 80.0 parts |
| Isobutanol | 10.0 parts |

Each of the aforesaid heat transfer image-receiving sheets was overlaid on the heat transfer sheet, while the dye layer was in opposition to the surface of the dye-receiving layer. With a thermal sublimation type of transfer printer (VY-50 made by Hitachi Ltd.), a printing energy of 40 mJ mm$^2$ was applied to the assembly from the back side of the heat transfer sheet through the thermal head for solid printing at a medium density. The quality and resistance to fingerprints and plasticizers of each of the obtained images were estimated. The results are reported in Table 2.

EXAMPLE B5

A dye layer forming ink composition composed of the following components was prepared and, then, coated with a wire bar on a 6 μm-thick polyethylene terephthalate film subjected to a heat-resistant treatment on its back side to a dry coverage of 1.0 g/m$^2$. Subsequent drying gave a heat transfer sheet.

| | |
|---|---|
| Disperse dye (Bymicron SNVP2670 made by Bayer Co., Ltd.) | 4.0 parts |
| Polyvinyl butyral resin (Eslec BX-1 made by Sekisui Chemical Co., Ltd., Japan) | 25.0 parts |
| Methyl ethyl ketone/toluene (at a weight ratio of 1:1) | 68.0 parts |

The heat transfer image-receiving sheet of Comp. Ex. B1 was overlaid on the aforesaid heat transfer sheet, while the dye layer was in opposition to the surface of the dye-receiving layer. With a thermal sublimation type of transfer printer (VY-50 made by Hitachi Ltd.), a printing energy of 40 mJ/mm$^2$ was applied to the assembly from the back side of the heat transfer sheet through the thermal head for solid printing at a medium density. The quality and resistance to fingerprints and plasticizers of the obtained image were estimated. The results are reported in Table 2.

EXAMPLE B6

With the heat transfer sheet used in Ex. B1 and the heat transfer image-receiving sheet of Comp. Ex. B1, heat transfer was carried out in the same manner as described in Ex. B5. A solution of 3 parts of vinyltrichlorosilane in 100 parts of distilled water, which had been stirred at 70° C. for 30 minutes, was sprayed over the obtained image, which was in turn dried in an oven at 80° C. for 10 minutes. The quality and resistance to fingerprints and plasticizers of the thus treated image were estimated. The results are reported in Table 2.

TABLE 2

| | WHAT WAS ESTIMATED | | |
|---|---|---|---|
| | QUALITY | RESISTANCE TO FINGER-PRINTS | RESISTANCE TO PLASTIC-IZERS |
| Ex. B1 | ○ | ○ | ○ |
| Ex. B2 | ○ | ○ | ○ |
| Ex. B3 | ○ | ○ | ○ |
| Ex. B4 | ○ | ○ | ○ |
| Ex. B5 | ○ | ○ | ○ |
| Ex. B6 | ○ | ○ | ○ |
| Comp. Ex. B1 | ○ | X | X |
| Comp. Ex. B2 | X | Δ | Δ |
| Comp. Ex. B3 | X | Δ | Δ |

TABLE 2-continued

| | WHAT WAS ESTIMATED | | |
|---|---|---|---|
| | QUALITY | RESISTANCE TO FINGER-PRINTS | RESISTANCE TO PLASTIC-IZERS |
| Comp. Ex. B4 | ○ | X | X |
| Comp. Ex. B5 | x (the sensitivity dropped with the occurrence of unusual transfer) | | |

CRITERIA FOR ESTIMATION

Image Quality

After each image had been subjected to accelerated testing at 60° C. for 3 days, its clearness, color reproducibility and resolution were visually observed.

○: No change occurred.
Δ: Slight fading or discoloration was found.
×: Remarkable fading or discoloration was found.

Resistance to Fingerprints

A fingerprint was printed under pressure on each image surface, which was in turn allowed to stand at 60° C. for 3 days to observe changes in the image.

○: No change occurred.
Δ: Slight fading or discoloration was found.
×: Remarkable fading or discoloration was found.

Resistance to Plasticizers

A plastic eraser was placed on each image surface, to which a load of 250 g cm$^2$ was applied at 30° C. over 40 minutes. Thereafter, changes in the image were visually observed.

○: No change occurred.
Δ: Slight fading or discoloration was found.
×: Remarkable fading or discoloration was found.

EXAMPLE C1

A synthetic paper (Yupo FRG-150 of 150 μm in thickness, made by Oji Yuka Co., Ltd.) was used as a substrate film. With a bar coater, a coating solution having the following composition was coated on one surface of the substrate film to a dry coverage of 5.0 g/m$^2$. Subsequent drying gave a heat transfer image-receiving sheet according to this invention.

| | |
|---|---|
| Polyester resin (Vylon 600 made by Toyobo Co., Ltd., Japan) | 20 parts |
| Vinyltriethoxysilane | 3 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 73 parts |

EXAMPLE C2

Example C1 was repeated, provided that a coating solution of Example C1, thereby obtaining a heat transfer image-receiving sheet according to this invention.

| | |
|---|---|
| Polyester resin (Vylon 600 made by Toyobo Co., Ltd., Japan) | 25 parts |
| Vinyltrimethoxysilane | 5 parts |
| Amino-modified silicone (X-22-3050C made by The Shin-Etsu Chemical Co., Ltd., Japan) | 1 part |
| Epoxy-modified silicone (X-22-3000E made by The Shin-Etsu Chemical Co., Ltd., Japan) | 1 part |

-continued

| | |
|---|---|
| Methyl ethyl ketone/toluene (1:1) | 68 parts |

EXAMPLE C3

Example C1 was repeated, provided that the following coating solution was used in place of that of Example C1, thereby obtaining a heat transfer image-receiving sheet according to this invention.

| | |
|---|---|
| Vinyl chloride/vinyl acetate copolymer (#1000A made by Denki Kagaku Kogyo K.K., Japan) | 23 parts |
| Vinyl-tris(β-methoxyethoxy)silane | 5 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 68 parts |

EXAMPLE C4

Example C1 was repeated, provided that the following coating solution was used in place of that of Example C1, thereby obtaining a heat transfer image-receiving sheet according to this invention.

| | |
|---|---|
| Polyester resin (Vylon 600 made by Toyobo Co., Ltd., Japan) | 27 parts |
| Vinyltrichlorosilane | 4 parts |
| Amino-modified silicone (X-22-3050C made by The Shin-Etsu Chemical Co., Ltd., Japan) | 1 part |
| Epoxy-modified silicone (X-22-3000E made by The Shin-Etsu Chemical Co., Ltd., Japan) | 1 part |
| Methyl ethyl ketone/toluene (1:1) | 67 parts |

COMPARATIVE EXAMPLE C1

A coating solution having the following composition was used in place of that of Ex. C1 under otherwise similar conditions as applied in Ex. C1, thereby obtaining a comparative heat transfer image-receiving sheet.

| | |
|---|---|
| Polyester resin (Vylon 600 made by Toyobo Co., Ltd., Japan) | 25 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 71 parts |

COMPARATIVE EXAMPLE C2

A coating solution having the following composition was used in place of that of Ex. C1 under otherwise similar conditions as applied in Ex. C1, thereby obtaining a comparative heat transfer image-receiving sheet.

| | |
|---|---|
| Polyester resin (Vylon 600 made by Toyobo Co., Ltd., Japan) | 20 parts |
| γ-aminopropyl triethoxy silane | 3 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 73 parts |

COMPARATIVE EXAMPLE C3

A coating solution having the following composition was used in place of that of Ex. C1 under otherwise similar conditions as applied in Ex. C1, thereby obtaining a comparative heat transfer image-receiving sheet.

| | |
|---|---|
| Polyester resin (Vylon 600 made by Toyobo Co., Ltd., Japan) | 20 parts |
| γ-glycidoxypropyl triethoxy silane | 3 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 73 parts |

COMPARATIVE EXAMPLE C4

A coating solution having the following composition was used in place of that of Ex. C1 under otherwise similar conditions as applied in Ex. C1, thereby obtaining a comparative heat transfer image-receiving sheet.

| | |
|---|---|
| Polyester resin (Vylon 600 made by Toyobo Co., Ltd., Japan) | 20 parts |
| Vinyltriethoxysilane | 0.02 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 76 parts |

COMPARATIVE EXAMPLE C5

A coating solution having the following composition was used in place of that of Ex. C1 under otherwise similar conditions as applied in Ex. C1, thereby obtaining a comparative heat transfer image-receiving sheet.

| | |
|---|---|
| Polyester resin (Vylon 600 made by Toyobo Co., Ltd., Japan) | 20 parts |
| Vinyltriethoxysilane | 25 parts |
| Amino-modified silicone (X-22-3050C made by The Shin-Etsu Chemical Co., Ltd., Japan) | 2 parts |
| Epoxy-modified silicone (X-22-3000E made by The Shin-Etsu Chemical Co., Ltd., Japan) | 2 parts |
| Methyl ethyl ketone/toluene (1:1) | 51 parts |

A dye layer forming ink composition composed of the following components was prepared and, then, coated with a wire bar on a 6 μm-thick polyethylene terephthalate film subjected to a heat-resistant treatment on its back side to a dry coverage of 1.0 g/m$^2$. Subsequent drying gave a heat transfer sheet.

| | |
|---|---|
| Disperse dye (Kayaset Blue 714 - C.I. Solvent Blue 63 made by Nippon Kayaku K.K., Japan) | 4.0 parts |
| Polyvinyl butyral resin (Eslec BX-1 made by Sekisui Chemical Co., Ltd., Japan) | 4.3 parts |
| Fluorine fatty acid-modified silicone wax (X-24-3525 made by The Shin-Etsu Chemical Co., Ltd., Japan) | 0.4 parts |
| Methyl ethyl ketone/toluene (at a weight ratio of 1:1) | 80.0 parts |
| Isobutanol | 10.0 parts |

Each of the aforesaid heat transfer image-receiving sheets was overlaid on the heat transfer sheet, while the dye layer was in opposition to the surface of the dye-receiving layer. With a thermal sublimation type of transfer printer (VY-50 made by Hitachi Ltd.), a printing energy of 40 mJ/mm$^2$ was applied to the assembly from the back side of the heat transfer sheet through the thermal head for solid printing at a medium density. The quality and resistance to fingerprints and plasticizers of each of the obtained images were estimated. The results are reported in Table 3.

EXAMPLE C5

A dye layer forming ink composition composed of the following components was prepared and, then, coated with a wire bar on a 6 μm-thick polyethylene terephthalate film subjected to a heat-resistant treatment on its back side to a dry coverage of 1.0 g/m$^2$. Subsequent drying gave a heat transfer sheet.

| | |
|---|---|
| Disperse dye (Bymicron SNLP2670 made by Bayer Co., Ltd.) | 4.0 parts |
| Polyvinyl butyral (Eslec BX-1 made by Sekisui Chemical Co., Ltd.) | 25.0 parts |
| Methyl ethyl ketone/toluene (at a weight ratio of 1:1) | 68.0 parts |

The heat transfer image-receiving sheet of Comp. Ex. C1 was overlaid on the aforesaid heat transfer sheet, while the dye layer was in opposition to the surface of the dye-receiving layer. With a thermal sublimation type of transfer printer (VY-50 made by Hitachi Ltd.), a printing energy of 40 mJ/mm$^2$ was applied to the assembly from the back side of the heat transfer sheet through the thermal head for solid printing at a medium density. The quality and resistance to fingerprints and plasticizers of the obtained image were estimated. The results are reported in Table 3.

EXAMPLE C6

With the heat transfer sheet used in Ex. C1 and the heat transfer image-receiving sheet of Comp. Ex. C1, heat transfer was carried out in the same manner as described in Ex. C5. A solution of 3 parts of vinyltrichlorosilane in 100 parts of distilled water, which had been stirred at 70° C. for 30 minutes, was sprayed over the obtained image, which was in turn dried in an oven at 80° C. for 10 minutes. The quality and resistance to fingerprints and plasticizers of the thus treated image were estimated. The results are reported in Table 3.

TABLE 3

| | WHAT WAS ESTIMATED | | |
|---|---|---|---|
| | QUALITY | RESISTANCE TO FINGER-PRINTS | RESISTANCE TO PLASTIC-IZERS |
| Ex. C1 | O | O | O |
| Ex. C2 | O | O | O |
| Ex. C3 | O | O | O |
| Ex. C4 | O | O | O |
| Ex. C5 | O | O | O |
| Ex. C6 | O | O | O |
| Comp. Ex. C1 | O | X | X |
| Comp. Ex. C2 | X | Δ | Δ |
| Comp. Ex. C3 | X | Δ | Δ |
| Comp. Ex. C4 | O | X | X |
| Comp. Ex. C5 | x (the sensitivity dropped with the occurrence of unusual transfer) | | |

CRITERIA FOR ESTIMATION

Image Quality

After each image had been subjected to accelerated testing at 60° C. for 3 days, its clearness, color reproducibility and resolution were visually observed.

○: No change occurred.

Δ: Slight fading or discoloration was found.

×: Remarkable fading or discoloration was found.

Resistance to Fingerprints

A fingerprint was printed under pressure on each image surface, which was in turn allowed to stand at 60° C. for 3 days to observe changes in the image.

○: No change occurred.

Δ: Slight fading or discoloration was found.

×: Remarkable fading or discoloration was found.

Resistance to Plasticizers

A plastic eraser was placed on each image surface, to which a load of 250 g/cm$^2$ was applied at 30° C. over 40 minutes. Thereafter, changes in the image were visually observed.

○: No change occurred.

Δ: Slight fading or discoloration was found.

×: Remarkable fading or discoloration was found.

EXAMPLE D1

With gravure printing, a dye layer forming ink composition composed of the following components was coated on a 6 μm-thick polyethylene terephthalate substrate film subjected to a heat-resistant treatment on its back side to a dry coverage of 1.0 g/m$^2$. Subsequent drying gave a heat transfer sheet in a continuous film form.

| | |
|---|---|
| Disperse dye (Kayaset Blue 714 - C.I. Solvent Blue 63 made by Nippon Kayaku K.K., Japan) | 4.0 parts |
| Polyvinyl butyral resin (Eslec BX-1 made by Sekisui Chemical Co., Ltd., Japan) | 4.3 parts |
| Fluorine fatty acid-modified silicone wax (X-24-3525 made by The Shin-Etsu Chemical Co., Ltd., Japan) | 0.4 parts |
| Methyl ethyl ketone/toluene (at a weight ratio of 1:1) | 80.0 parts |
| Isobutanol | 10.0 parts |

EXAMPLE D2

An ink having the following composition was used in place of the ink of Ex. D1 under otherwise similar conditions as in Ex. D1, thereby obtaining a heat transfer sheet according to this invention.

| | |
|---|---|
| Polyvinyl butyral (Eslec BX-1 made by Sekisui Chemical Co., Ltd., Japan) | 5 parts |
| Disperse dye (Bymicron SNVP2670 made by Bayer, Co., Ltd.) | 4 parts |
| Vinyltrimethoxysilane | 4 parts |
| Methyl ethyl ketone/toluene (at a weight ratio of 1:1) | 87.0 parts |

EXAMPLE D3

An ink having the following composition was used in place of the ink of Ex. D1 under otherwise similar conditions as in Ex. D1, thereby obtaining a heat transfer sheet according to this invention.

| | |
|---|---|
| Polyvinyl butyral (Eslec BX-1 made by Sekisui Chemical Co., Ltd., Japan) | 5 parts |
| Disperse dye (Bymicron SNVP2670 made by Bayer, Co., Ltd.) | 4 parts |
| Vinyl-tris(β-methoxyethoxy)silane | 2 parts |
| Methyl ethyl ketone/toluene (at a weight ratio of 1:1) | 89.0 parts |

EXAMPLE D4

An ink having the following composition was used in place of the ink of the Ex. D1 under otherwise similar conditions as in Ex. D1, thereby obtaining a heat transfer sheet according to this invention.

| | |
|---|---|
| Polyvinyl butyral (Eslec BX-1 made by Sekisui Chemical Co., Ltd., Japan) | 5 parts |
| Disperse dye (Phorone Brilliant Yellow S-6GL, made by Sand, Co., Ltd.) | 4 parts |
| γ-methacryloxypropyl trimethoxy silane | 4 parts |
| Methyl ethyl ketone/toluene (at a weight ratio of 1:1) | 87.0 parts |

EXAMPLE D5

With gravure printing, a dye layer forming ink composition composed of the following components was coated on one side of the same polyethylene terephthalate film as used in Ex. D1 to a dry coverage of 1.0 g/m$^2$. Subsequent drying gave a dye layer.

| | |
|---|---|
| Polyvinyl butyral (Eslec BX-1 made by Sekisui Chemical Co., Ltd., Japan) | 5 parts |
| Disperse dye (Bymicron SNVP2670 made by Bayer, Co., Ltd.) | 4 parts |
| Methyl ethyl ketone/toluene (at a weight ratio of 1:1) | 91.0 parts |

The following coating solution was further coated on the surface of the aforesaid dye layer in an amount of 0.1 g/m$^2$, calculated as solid matter. Subsequent drying gave a heat transfer sheet in a continuous film form according to this invention.

| | |
|---|---|
| Polyvinyl butyral (Eslec BX-1 made by Sekisui Chemical Co., Ltd., Japan) | 5 parts |
| Vinyltrimethoxysilane | 4 parts |
| Methyl ethyl ketone/toluene (at a weight ratio of 1:1) | 91.0 parts |

EXAMPLE D6

With gravure printing, the dye layer forming ink composition composed of Ex. D5 was coated on one side at a width of 30 cm and an interval of 30 cm of the same polyethylene terephthalate film as used in Ex. D1 to a dry coverage of 1.0 g/m$^2$. Subsequent drying gave a dye layer.

The following coating solution was further coated on an uncoated region of the film adjacent to the aforesaid dye layer in an amount of 0.1 g/m$^2$, calculated as solid matter. Subsequent drying gave a heat transfer sheet in a continuous film form according to this invention.

| | |
|---|---|
| Polyvinyl butyral (Eslec BX-1 made by Sekisui Chemical Co., Ltd., Japan) | 5 parts |
| Vinyltrimethoxysilane | 3 parts |
| γ-methacryloxypropyl trimethoxy silane | 2 parts |
| Methyl ethyl ketone/toluene (at a weight ratio of 1:1) | 90.0 parts |

COMPARATIVE EXAMPLE D1

An ink composition consisting of the following components was used in place of that of Ex. D1 under otherwise similar conditions as in Ex. D1, thereby obtaining a comparative heat transfer sheet.

| | |
|---|---|
| Polyvinyl butyral (Eslec BX-1 made by Sekisui Chemical Co., Ltd., Japan) | 5 parts |
| Disperse dye (Bymicron SNVP2670 made by Bayer, Co., Ltd.) | 4 parts |
| Methyl ethyl ketone/toluene (at a weight ratio of 1:1) | 91.0 parts |

COMPARATIVE EXAMPLE D2

An ink composition consisting of the following components was used in place of that of Ex. D1 under otherwise similar conditions as in Ex. D1, thereby obtaining a comparative heat transfer sheet.

| | |
|---|---|
| Polyvinyl butyral (Eslec BX-1 made by Sekisui Chemical Co., Ltd., Japan) | 5 parts |
| Disperse dye (Bymicron SNVP2670 made by Bayer, Co., Ltd.) | 4 parts |
| N-β(aminoethyl)γ-aminopropyl trimethoxy silane | 4 parts |
| Methyl ethyl ketone/toluene (at a weight ratio of 1:1) | 87.0 parts |

COMPARATIVE EXAMPLE D3

An ink composition consisting of the following components was used in place of that of Ex. D1 under otherwise similar conditions as in Ex. D1, thereby obtaining a comparative heat transfer sheet.

| | |
|---|---|
| Polyvinyl butyral (Eslec BX-1 made by Sekisui Chemical Co., Ltd., Japan) | 5 parts |
| Disperse dye (Bymicron SNVP2670 made by Bayer, Co., Ltd.) | 4 parts |
| γ-gylcidoxypropyl trimethoxy silane | 0.05 parts |
| Methyl ethyl ketone/toluene (at a weight ratio of 1:1) | 91.0 parts |

COMPARATIVE EXAMPLE D5

An ink composition consisting of the following components was used in place of that of Ex. D1 under otherwise similar conditions as in Ex. D1, thereby obtaining a comparative heat transfer sheet.

| | |
|---|---|
| Polyvinyl butyral (Eslec BX-1 made by Sekisui Chemical Co., Ltd., Japan) | 5 parts |
| Disperse dye (Bymicron SNVP2670 made by Bayer, Co., Ltd.) | 4 parts |
| Vinyltriethoxysilane | 10 parts |
| Methyl ethyl ketone/toluene (at a weight ratio of 1:1) | 81.0 parts |

A synthetic paper (Yupo FRG-150 of 150 μm in thickness, made by Oji Yuka Co., Ltd.) was then used as a substrate film. A coating solution having the following composition was coated on one surface of the synthetic paper to a dry coverage of 4.5 $g/m^2$. Subsequent 30-minute drying at 100° C. gave a heat transfer image-receiving sheet according to this invention.

| | |
|---|---|
| Polyester resin (Vylon 600 made by Toyobo Co., Ltd.) | 11.5 parts |
| Vinyl chloride/vinyl acetate copolymer (VYHH made by UCC) | 5.0 parts |
| Amino-modified silicone oil (KF393 made by The Shin-Etsu Chemical Co., Ltd.) | 1.2 parts |
| Epoxy-modified silicone oil (X-22-343 mde by The Shin-Etsu Chemical Co., Ltd.) | 1.2 parts |
| Methyl ethyl ketone | 40.8 parts |
| Toluene | 40.8 parts |
| Cyclohexane | 20.4 parts |

The aforesaid heat transfer image-receiving sheet was overlaid on each of the aforesaid heat transfer sheets, while the dye layer was in opposition to the surface of the dye-receiving layer. With a thermal sublimation type of transfer printer (VY-50 made by Hitachi Ltd.), a printing energy of 40 $mJ/mm^2$ was applied to the assembly from the back side of the heat transfer sheet through the thermal head for solid printing at a medium density. The quality and resistance to fingerprints and plasticizers of each of the obtained images were estimated. The results are reported in Table 4. It is noted that in Ex. D6, the silane coupling agent was further transferred onto the surface.

TABLE 4

| | WHAT WAS ESTIMATED | | |
|---|---|---|---|
| | QUALITY | RESISTANCE TO FINGER-PRINTS | RESISTANCE TO PLASTIC-IZERS |
| Ex. D1 | ○ | ○ | ○ |
| Ex. D2 | ○ | ○ | ○ |
| Ex. D3 | ○ | ○ | ○ |
| Ex. D4 | ○ | ○ | ○ |
| Ex. D5 | ○ | ○ | ○ |
| Ex. D6 | ○ | ○ | ○ |
| Comp. Ex. D1 | ○ | X | X |
| Comp. Ex. D2 | X | Δ | Δ |
| Comp. Ex. D3 | X | Δ | Δ |
| Comp. Ex. D4 | ○ | X | X |
| Comp. Ex. D5 | x *1 | | |

*1:The silane coupling agent was incompatible in the resin and was of repellency so strong to the film that the coating solution could not successfully be applied to the film.

CRITERIA FOR ESTIMATION

Image Quality

After each image had been subjected to accelerated testing at 60° C. for 3 days, its clearness, color reproducibility and resolution were visually observed.

○: No change occurred.

Δ: Slight fading or discoloration was found.

×: Remarkable fading or discoloration was found.

Resistance to Fingerprints

A fingerprint was printed under pressure on each image surface, which was in turn allowed to stand at 60° C. for 3 days to observe changes in the image.

○: No change occurred.

Δ: Slight fading or discoloration was found.

×: Remarkable fading or discoloration was found.

Resistance to Plasticizers

A plastic eraser was placed on each image surface, to which a load of 250 $g/cm^2$ was applied at 30° C. over 40 minutes. Thereafter, changes in the image were visually observed.

○: No change occurred.

Δ: Slight fading or discoloration was found.

×: Remarkable fading or discoloration was found.

We claim:

1. A heat transfer image-receiving sheet comprising:
a substrate film; and
a dye-receiving layer formed on one side of said substrate film, said dye-receiving layer comprising a resin and containing therein or thereon a silane coupling agent having a polymerizable double bond, said silane coupling agent being present in an amount of 0.1 to 120 parts by weight per 100 parts by weight of the resin.

2. A heat transfer imaged article comprising:
a substrate film;
a dye-receiving layer formed on one side of said substrate film, said dye-receiving layer containing therein or thereon a silane coupling agent having a polymerizable double bond; and
a dye image heat-transferred onto said dye-receiving layer.

3. The heat transfer imaged article of claim 2, wherein said dye-receiving layer includes a resin, and said silane coupling agent is present in an amount of 0.1 to 120 parts by weight per 100 parts by weight of said resin.

4. A heat transfer sheet comprising:
a substrate film; and
a dye layer formed on said substrate film,
said dye layer consisting essentially of a resin and containing therein or thereon a thermally migrating silane coupling agent having a polymerizable double bond, said silane coupling agent being present in an amount of 0.1 to 120 parts by weight per 100 parts by weight of the resin.

5. A heat transfer sheet comprising:
a substrate film;
a dye layer comprising a dye and a binder; and
a heat transfer layer containing a silane coupling agent having a polymerizable double bond.

* * * * *